United States Patent Office 3,485,945
Patented Dec. 23, 1969

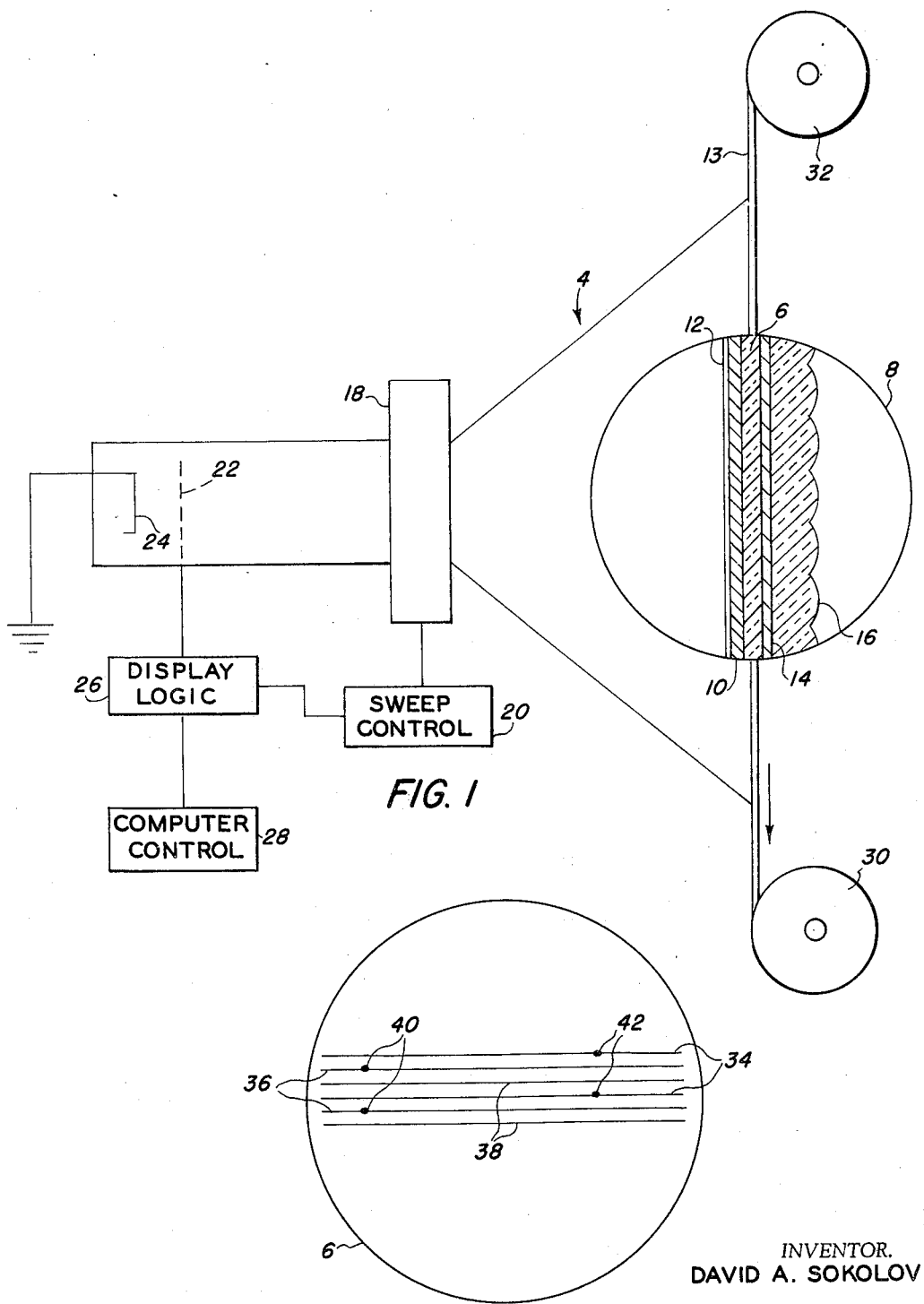

3,485,945
ELECTRONIC LENTICULAR RECORDING SYSTEM
David A. Sokolov, Fairport, N.Y., assignor to Xerox Corporation, Rochester, N.Y., a corporation of New York
Filed Oct. 3, 1966, Ser. No. 583,543
Int. Cl. H04n 5/84
U.S. Cl. 178—5.4                                5 Claims

ABSTRACT OF THE DISCLOSURE

A recording system wherein a lenticulated recording medium is placed in contact with a cathode ray tube with its lenticles facing away from the tube while monochromatic images of primary color components are displayed on the tube in three interlaced fields to form an image on the recording medium. Each lenticule is aligned with a trio of interlaced fields so that the three primary colors of an elemental area are imaged onto each lenticule.

---

This invention relates to a recording system for monochromatic images for subsequent projection in a full color display. More particularly, this invention relates to a lenticular recording system.

At the present time, there is a great need for a display system which permits a large screen projection of a complex graphic pattern. An example of such a need could be aircraft traffic control where various aircraft have been detected in a specified area and it is necessary to identify each aircraft not only by its type, i.e., commercial, military, unknown, or private, but also by its relative position and general direction and speed. Such a pattern of detected aircraft would be complex and would be obviously ever changing as aircraft enter and leave the specified area or alter their direction, etc.

Because of the complexity and ever changing characteristics of the pattern to be displayed, it is desirable if, in addition to the relative positions of the various aircraft on the pattern, that such aircraft could be coded with various colors. For example, a red color symbol could indicate a commercial aircraft while a blue symbol indicates a military aircraft, etc. It would also be desirable if the pertinent information regarding a particular aircraft could also be in the same color as that relating to that type of aircraft.

Due to the importance of maintaining the pattern in a very current state, color-sensitive photographic film has proved to be too slow in processing to allow the required updating of the pattern display. Therefore, it has been necessary to utilize monochromatic recording of the particular pattern for subsequent projection through a suitable color filter assembly to provide a full color display of the pattern. In this manner, updating of the pattern may be made expediently and quickly.

However, the recording systems utilized in the prior art have been restricted to systems wherein different color-identified portions of a monochromatic display are sequentially projected onto a light sensitive recording medium including a lenticular layer. The sequential display of monochromatic information is latently registered on interlaced portions of the light sensitive medium by way of a movable aperture plate positioned at the aperture of the recording lens, the movement of this aperture plate being coordinated with the display of successive portions of information. The light sensitive recording medium is then developed and projected through a color filter which is banded in accordance with the nominal color identification of the several openings in the aperture plate whereby projection of light through the developed recording medium provides the desired full color display.

The prior art systems aforedescribed while greatly simplifying the preparation of colored graphical displays have in one respect been less than satisfactory. More particularly, a method has long been sought for eliminating the mechanical element in these prior systems represented by the movable aperture plate utilized to define the separation images. This latter element not only introduces the usual bulk and the speed limitations associated with the moving mechanical elements, but, in addition, requires considerable control circuitry, electric motors, and so forth, to achieve the precise and exactly timed movement of the aperture plate necessary to achieve synchronization with display of the separation images.

It is an object of the present invention to improve and simplify lenticular display systems.

It is a further object of the present invention to provide an improved apparatus for recording monochromatic displays for utilization and conversion to full color displays by additive color synthesis.

These and other objects of the present invention are accomplished through a novel system wherein a monochromatic cathode ray tube is utilized to generate three interlaced fields, each field corresponding to a particular color in a desired scheme of coding. A lenticulated photoreceptor is positioned in contact with and movable relation to the face plate of this cathode ray tube to record the monochromatic images generated during the aforementioned interlaced fields.

For a better understanding of the invention, as well as other objects and features thereof, reference may be made to the folowing description of the invention to be read in connection with the accompanying drawings, wherein:

FIGURE 1 is a block diagram showing the overall system in accordance with the present invention; and, FIGURE 2 shows a partial scanning pattern of the cathode ray tube illustrated in FIGURE 1.

In lenticular display systems a monochromatic photoreceptor has recorded thereon in an interlaced pattern intensity modulated light. This light is modulated in accordance with the various information to be later displayed in full color. The photoreceptor has adhered to one side thereof a lenticulated lens structure. The light pattern recorded on the photoreceptor usually includes three lines per each horizontal elemental area, each line in this elemental area being associated with a particular color in the filter of the projection system.

By the term "line" it is means that subelemental area of the photoreceptor which would be impinged by an unmodulated light spot as it is deflected in a horizontal direction or a direction transverse to the direction of movement of the photoreceptor.

Each lenticule of the photoreceptor is associated with this trio of interlaced lines such that, when light is projected through the photoreceptor, the lens action of the lenticulated surface will focus each particular line through its respective color band on a suitably positioned filter. The light then passing through the bands of the filter is focused on a display screen in another interlaced pattern of lines. However, the lines are now in color and because of the size of each line and their proximity to each other, the eye will integrate the three colors present in the interlaced pattern and perceive a composite color, which is a function of the intensity of the light pattern recorded on the light sensitive photoreceptor. For example, if the three colors used are the primary colors of red, blue and green, and the original interlaced lines recorded on the recording medium are full intensity modulated, then the pattern perceived by the eye in the final full color display will be white. Any modulation of the light recorded in the interlaced pattern on the recording medium will result in a color depending upon which line is modulated. In this manner, by modulating the light incident on the recording medium associated with one or more of the interlaced lines, a variety of colors may be obtained in the final full color display.

Reference will now be made to FIGURES 1 and 2 in the drawings.

FIGURE 1 shows a cathode ray tube (CRT) 4 of conventional design having a transparent face plate 6, a portion of which is shown in the enlargement 8.

The face plate 6 has on one surface thereof a nominally monochromatic phosphor layer 10 which may be overlaid with an electron permeable, light reflecting layer 12. Referring still to this enlargement 8, a lenticulated recording medium 13 is also illustrated and includes a light sensitive layer 14 having one surface thereof in contact with the face plate 6 of the CRT 4. The other surface of the light sensitive layer 14 is adhered to and in integral relationship with a transparent lenticulated structure 16.

The CRT 4 further includes a conventional electromagnetic deflection yoke 18 which is supplied with suitable sweep signals from a sweep generator 20 of conventional design. A grid or control electrode 22 is interposed between the deflection yoke 18 and a grounded cathode 24 to provide modulation of the electron beam emanating from the cathode 24. This control electrode 22 is connected to conventional display logic circuitry 26 which in turn receives signals from a computer control circuit 28, for example. The interconnection between the display logic 26 and the sweep control circuit 20 may provide suitable synchronization between the deflection of the electron beam and its modulation.

The cathode ray tube 4 may contain other conventional control structure such as accelerating and focusing electrodes which have not been illustrated in order to preserve the simplicity of the drawing.

The light sensitive layer 14 preferably maintains contact with the face plate 6 in the area of recording and is moved in a step-by-step manner across this recording area by way of a take-up reel 30 which may be driven by suitable step driven apparatus which is not illustrated. A supply reel 32 provides a continuous supply of fresh recording medium 13 for recording with the cathode ray tube 4.

In this manner, the recording medium 13 is indexed via the take-up reel 30, for example, to position a fresh area of the light sensitive layer 14 in contact with the recording area of the face plate 6. After recording of the light images generated by the CRT has been completed, the recording medium 13 is once again indexed or stepped to advance the recorded portion thereof to a suitable developing station, for example, while moving a fresh area of layer 14 to the recording area of the CRT.

It is understood that the spectral response of the light sensitive layer 14 of the recording medium 13 is preferably matched with the light emitted by phosphor layer 10 upon electron impingement. The face plate 6 would accordingly be transmissive to this light emitted by the phosphor layer 10.

Reference is now made to FIGURE 2 which illustrates a portion of a sweep pattern on the face plate 6 of the cathode ray tube 4 as illustrated in FIGURE 1. Such a pattern may be generated in a conventional field sequential manner.

As may be seen in this FIGURE 2, six lines are illustrated to exemplify the sweep of the electron beam provided by the sweep control circuit 20 and the deflection yoke 18. The lines designated by the reference numeral 34 may be associated with one color, for example, red. The pair of lines designated by the reference numerals 36 and 38 may be associated with two other colors, for example, blue and green, respectively. It should be understood that these colors are not visible from observation of the face plate of the cathode ray tube 4 during its operation. On the contrary, these lines may represent only gradations of gray between the ranges of black, or no light, and white, or full intensity light, assuming a white phosphor is employed in layer 10. In this manner, an interlaced configuration is generated with each elemental area comprising three interlaced lines 34, 36, and 38. The next successive elemental area will also contain the same pattern of interlaced lines providing that these lines are actually generated by electron impact on the phosphor screen 10.

As noted hereinabove, each trio of interlaced lines representative of three colors is selectively positioned substantially in alignment with a lenticule of the lenticulated member 16. In this manner, during recording each lenticule of member 16 will be in alignment with three interlaced lines generated on the face plate 6 of the CRT 4. For example, as shown in FIGURE 2, the upper three lines 34, 36, 38 will be in alignment with one lenticule while the lower three lines 34, 36, and 38 will be in alignment with the next adjacent lenticule. This spaced relationship will also exist between the remaining successive trios of interlaced lines and their respective lenticules in the recording area of the face plate 6.

It should be readily understood that the relative dimensions of the interlaced lines and their relationship to each other has been greatly exaggerated in FIGURE 2 for purposes of illustration and explanation.

To further illustrate the technique and result of the recording system in accordance with the present invention, reference is made to the dots generally designated by reference numerals 40 and 42 in FIGURE 2. The dots 40 are located in vertical alignment with each other on lines 36. The dots 42 are also in vertical alignment with each other on lines 34 and spaced horizontally from the dots 40. These dots 40 and 42 may represent points of full intensity light emission from the phosphor layer 10. Therefore, if one was to view of the face plate under these conditions he would perceive actually two elemental dots or spots of light emanating in the vicinity of dots 40 and 42 as shown in FIGURE 2. The size of the dots and the spacing between the interlaced lines are such that these dots, separated by two intermediate lines, would be indiscernable as two pairs of dots and would appear as two dots to a viewer. However, in the final projection of light through the light sensitive layer 14 which has recorded these four dots 40 and 42, through the lenticular lens structure of the recording medium, and through a banded filter, these pairs of dots would appear, in this example, as a blue dot and a red dot, respectively, horizontally displaced from each other.

A suitable projection system for the recording medium 13 is disclosed in the copending application of Israel J. Melman, filed on Oct. 3, 1966, Ser. No. 583,635, entitled Electriconic Lenticular Display System, and assigned to the same assignee as the present application.

In operation, the system of the present invention will provide a raster of information in a recording area at the face plate 6 of the cathode ray tube 4 in FIGURE 1 which generates a corresponding pattern of light according to the modulation signal applied to control electrode 22 which is recorded by the recording medium 13 in contact with the face plate 6 of the cathode ray tube. In this manner, interlaced lines of information are recorded by the light sensitive layer 14 of the recording medium 13. Each line of this recording is associated with a particular color in the final full color display.

In summary, there has been described a novel recording system which is greatly simplified from the prior art systems for recording separate monochromatic images in an interlaced pattern on a light sensitive recording medium.

While the invention has been described with reference to the arrangement disclosed herein, it is not confined to the details set forth since it is apparent that equivalent components may be substituted for components of the preferred embodiment without departing from the scope of the invention. Thus, for example, although the recording medium has been shown as being a simple photographic member well known to the art of lenticular photography and including a lenticulated base 16 and a light sensitive layer 14, it may very well comprise a three-layered xerographic medium such as is disclosed in the copending application of Donald S. Cary, filed on Sept. 2, 1965, Ser. No. 484,606, entitled Color Display and assigned to the same assignee as the present invention. In addition, a recording medium such as that disclosed in the copending application of Donald S. Cary, filed Sept. 2, 1965, Ser. No. 484,600, entitled Frost Color Display, and assigned to the same assignee as the present application may also be used with the concept of the present invention.

Also, while a single cathode or electron gun is illustrated in a preferred embodiment for generating an electron beam which is deflected in a field sequential manner, three such guns may be employed and a line sequential deflection system utilized.

Additionally, while three colors are referred to in the above description, the concept of the present invention is applicable to two colors or more thereby necessitating an equal number of lines in each elemental area of interlaced lines.

Therefore, it is intended to cover all such modifications or changes that may come within the scope of the invention defined by the following claims.

What is claimed is:

1. A system for recording monochromatic information corresponding to a plurality of predetermined colors comprising:
    (a) display means including a cathode ray tube having a phosphor-coated face plate for generating a monochromatic light informational display at a plurality of sets of interlaced areas on said face plate, respective ones of said interlaced areas of said sets relating to a different one of said predetermined colors; and,
    (b) a recording medium including a light sensitive layer integral with a base member having a plurality of lenticules, said layer being in movable contact with said face plate and positioned relative to said sets of interlaced areas that there exists alignment between each of said sets and a lenticule of said base member.

2. A system as defined in claim 1 wherein:
    (a) said base member is transparent; and
    (b) said alignment is in a direction perpendicular to said face plate.

3. A system for recording on a lenticulated recording medium used in the projection of a polychromatic display wherein a plurality of predetermined colors are intensely modulated to form an effective composite color image, said system comprising:
    (a) display means, including a cathode ray tube having a phosphor-coated face plate, for generating a monochromatic informational pattern at a recording zone on said face plate comprising a plurality of sets of interlaced areas, respective ones of said interlaced areas of respective ones of said sets relating to a different one of said predetermined colors and represented by variations in said informational pattern; and
    (b) a recording medium including a light sensitive layer in movable contact with said face plate at said recording zone and a transparent support layer having a plurality of lenticules on one surface thereof, said recording medium positioned relative to said recording zone to provide alignment between successive ones of said sets and successive lenticules of said support layer, respectively.

4. A lenticular recording system comprising:
    (a) a cathode ray tube having
        (1) a source of electrons,
        (2) a phosphor-coated face plate,
        (3) means for forming said electrons into beam,
        (4) an electron beam control means for modulating said electron beam in accordance with a plurality of information signals each representative of a different one of a plurality of predetermined colors;
    (b) means for deflecting said electron beam across said face plate in a raster configuration including a plurality of fields having an interlaced relationship with each other, each of said fields being in time coincidence with one of said plurality of information signals representative of one of said predetermined colors; and,
    (c) a lenticulated photoreceptor including a photosensitive layer having two surfaces and a transparent member having one surface which is formed into a plurality of uniform, regularly spaced lenticules and another surface which is adhered to one of said surfaces of said photosensitive layer, the other surface of said photosensitive layer being in movable contact with said face plate.

5. A system as defined in claim 4 wherein
    (a) successive ones of said lenticules are in spatial alignment with successive portions of said plurality of interlaced fields, respectively, said successive portions including a portion of each of said fields.

References Cited

UNITED STATES PATENTS

| 2,638,498 | 5/1953 | France et al. | 178—5.4 |
| 2,944,894 | 7/1960 | Land | 96—3 |
| 3,184,753 | 5/1965 | Koster | 346—110 |
| 3,366,817 | 1/1968 | Miller | 313—73 |
| 3,395,246 | 7/1968 | Stetten | 178—6.8 |

ROBERT L. GRIFFIN, Primary Examiner

RICHARD P. LANGE, Assistant Examiner

U.S. Cl. X.R.

96—81; 350—167; 178—6.7

PO-1050
(5/69)

UNITED STATES PATENT OFFICE
CERTIFICATE OF CORRECTION

Patent No. 3,485,945            Dated December 23, 1969

Inventor(s) David A. Sokolov

It is certified that error appears in the above-identified patent and that said Letters Patent are hereby corrected as shown below:

In the specification, Column 2, line 47, the word "means" should read --meant--.

Column 3, line 40, the word "driven" should read --drive--.

SIGNED AND
SEALED
JUN 30 1970

(SEAL)
Attest:

Edward M. Fletcher, Jr.
Attesting Officer

WILLIAM E. SCHUYLER, JR.
Commissioner of Patents

UNITED STATES PATENT OFFICE
CERTIFICATE OF CORRECTION

Patent No. 3,485,945                Dated December 23, 1969

Inventor(s) David A. Sokolov

It is certified that error appears in the above-identified patent and that said Letters Patent are hereby corrected as shown below:

IN THE CLAIMS:

Claim 3, Column 5, Line 51, "intensely" should read --intensity--.

SIGNED AND SEALED
OCT 13 1970

WILLIAM E. SCHUYLER, JR.
Commissioner of Patents